(No Model.) 2 Sheets—Sheet 1.
H. MOESER.
MEANS FOR PREVENTING LEAKAGE OF GAS FROM MAINS.
No. 317,408. Patented May 5, 1885.
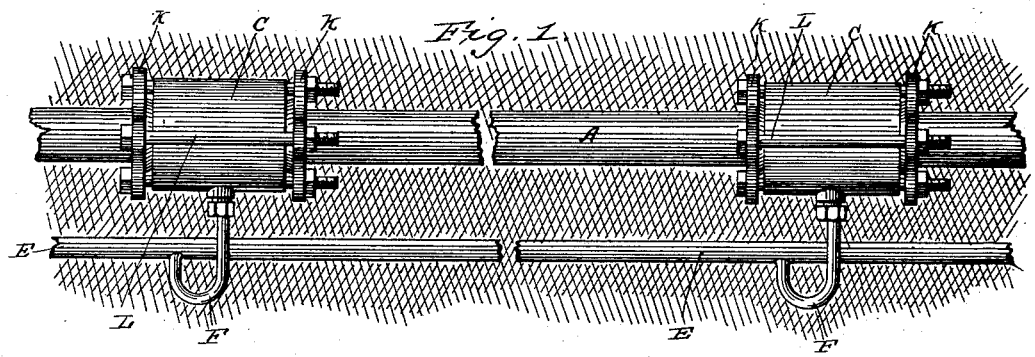
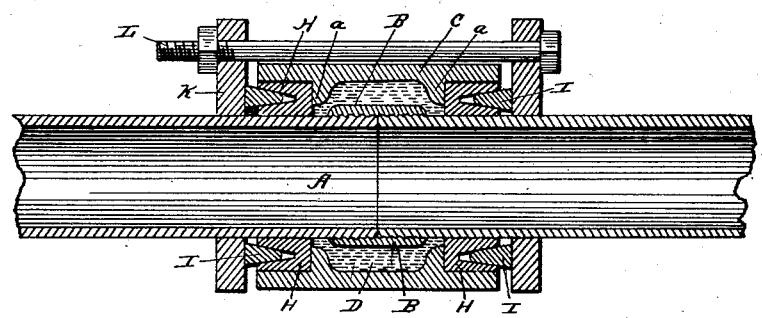
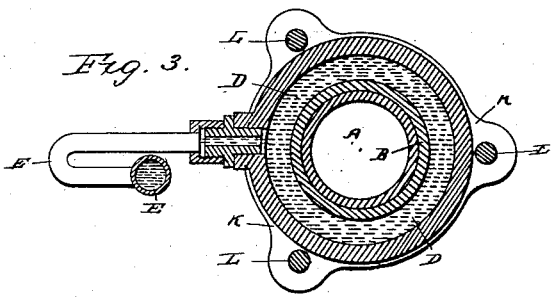
WITNESSES
Chas. D. Davis.
Edwin L. Jewell.
INVENTOR
Henry Moeser
Per C. M. Alexander
Attorney (No Model.)
H. MOESER.
MEANS FOR PREVENTING LEAKAGE OF GAS FROM MAINS.
No. 317,408. Patented May 5, 1885.
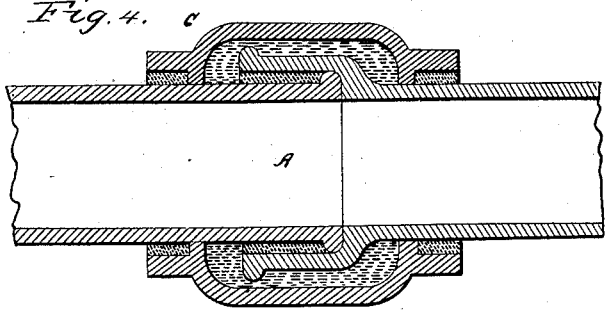
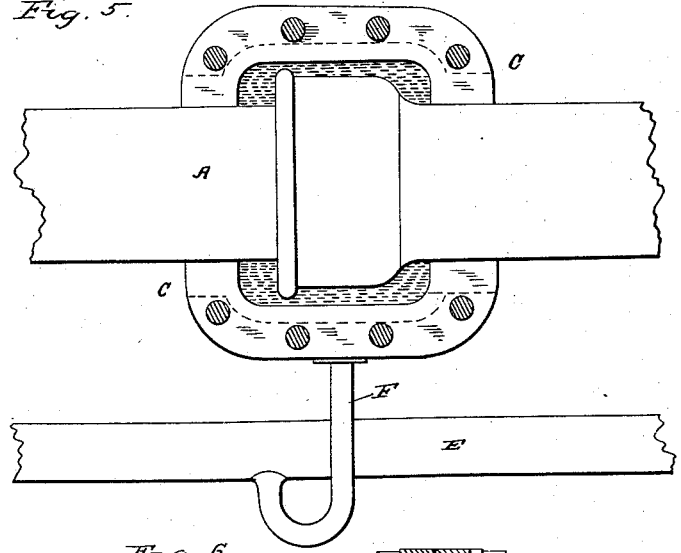
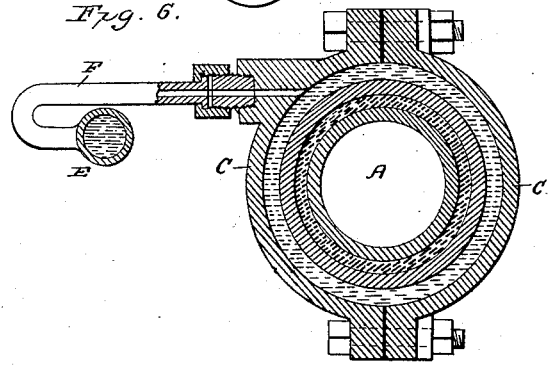

UNITED STATES PATENT OFFICE.

HENRY MOESER, OF PITTSBURG, PENNSYLVANIA.

MEANS FOR PREVENTING LEAKAGE OF GAS FROM MAINS.

SPECIFICATION forming part of Letters Patent No. 317,408, dated May 5, 1885.

Application filed February 24, 1885. (No model.)

*To all whom it may concern:*

Be it known that I, HENRY MOESER, a citizen of the United States, residing at Pittsburg, in the county of Allegheny and State of Pennsylvania, have invented certain new and useful Improvements in Means for Preventing Leakage of Gas from Mains, of which the following is a specification, reference being had therein to the accompanying drawings.

My invention relates to a mode of stopping or preventing the leakage of gas at the joints of gas-mains or underground gas-pipes.

While this invention is designed to be used more especially with conduits for the conveyance of the so-termed "natural gas" from one location to another, or from its source or well to the place of its utilization, it may also be applied usefully to conduits for ordinary or manufactured gas used for heating or illuminating purposes.

The object of this invention is to prevent the dangers to life and property caused by the leakage of gas from the mains or pipes in which it is conveyed through the streets of cities or other more or less densely-populated districts, and also to prevent the loss or waste of gas caused by such leakage. In the ordinary gas-conduits the leakage occurs principally (if not altogether) at the joints of the pipes, and it appears from the almost daily records of explosions and conflagrations caused by the leakage of natural gas from the conduits that all of the known modes of packing the said joints with the materials ordinarily used for the purpose—such as cements, lead, fibrous or other materials—have been found utterly inadequate to perfectly and permanently prevent leakage of a gas having the high pressure and subtilty of natural gas.

My present invention is an improvement upon the invention described in Letters Patent No. 310,841, granted to me the 13th day of January, 1885, in which the conduit-pipes were continuously surrounded by water.

My invention consists in surrounding the joints of pipe-connections with suitable chambers, into which water or other liquid is forced and kept under a higher degree of pressure than that of the gas contained in the conduit, as will be hereinafter set forth.

In the accompanying drawings, which make a part of this specification, Figure 1 represents a top view of a gas-conduit and water-supply pipe and connections. Fig. 2 is a longitudinal section of two sections of the gas-conduit and of the devices which surround the joint at their connection. Fig. 3 is a cross-section taken on the line of the joint-connection; and Figs. 4, 5, and 6 represent views illustrating the application of my invention to a gas-conduit, in which the pipes are connected by the ordinary cup-and-socket joint.

In the figures, A A represent two sections of a gas-main, which are to be connected together, and are connected and secured together by the well-known so termed "screw-joint," the coupling B being provided with a female screw and the ends of the main or pipes being provided with male threads to enter said coupling.

C represents a sleeve, which is made of a larger diameter than the main and surrounds the two sections of the mains at their joint. This sleeve is provided with two annular flanges, *a a*, on its inside a short distance from its ends. The outside of these flanges are at right angles, as seen, to the inner periphery of the sleeve.

H H represent annular rings made of lead or other soft metal, one surrounding each of the sections of the main, resting upon them and within the ends of the sleeve, each abutting against the flanges *a a* of the sleeve. In the outer rims of these rings are formed V-shaped annular grooves, as represented in Fig. 2.

I I represent two V-shaped rings made of suitable metal, said rings being made sufficiently large to allow thinner edges to pass into the V-shaped grooves in the rings H H.

K K represent two metallic heads, which pass over the sections of the main, and are a little farther apart than the length of the sleeve. These heads are connected together by bolts and nuts, by means of which they may be moved toward each other when necessary. These heads K K press against the outer rims of the rings I I.

When it is desired to pack the joint, the two heads are moved toward each other by means of the screw-bolts L, and bearing against the rings I I force them into the grooves of the rings H H, and cause them to spread until a perfectly tight joint is formed between the sections of the main and the interior of the sleeve from its ends to the annular flanges *a a*.

Within the sleeve and between its two flanges is left an annular water space or chamber. This chamber is longer than the coupling B over the joints of the main, so that said coupling is entirely surrounded upon its outside with a body of water.

E represents a water-pipe, which runs along parallel with the main and which is connected to the water-chamber within the sleeve by means of suitable pipe-connections, F F. These connecting-pipes may be packed in any of the well-known ways to prevent the escape of water. The water in the pipe is intended to exert a greater pressure than the gas within the main, and thus surely prevent any escape of gas into the water-chamber, in case even that there would be leakage otherwise.

I may use other modes of packing the ends of the sleeves.

Any other packing may be used that will make a water-tight joint.

Having thus fully described my invention, what I claim as new, and desire to secure by Letters Patent, is—

A means for preventing gas leakage at the joints of gas-mains, consisting of a jacket surrounding the joint with its couplings, cups, and sockets, or other connections, the jacket being so formed as to provide a water-tight chamber around the said joint, and a pipe connected to the said jacket, and means for supplying the chamber with fluid under pressure, substantially as and for the purpose specified.

In testimony whereof I affix my signature in presence of two witnesses.

HENRY MOESER.

Witnesses:
H. H. MOESER,
R. E. McCLURE.